United States Patent
Harbi et al.

(10) Patent No.: US 12,440,782 B2
(45) Date of Patent: Oct. 14, 2025

(54) NON-ASSOCIATED GAS CONDENSATE RECOVERY UTILIZING EJECTOR IN FLARING PROCESS

(71) Applicant: SAUDI ARABIAN OIL COMPANY, Dhahran (SA)

(72) Inventors: Mamdouh E. Harbi, Alhafouf (SA); Abdulhadi F. Al-Qahtani, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 206 days.

(21) Appl. No.: 18/050,309

(22) Filed: Oct. 27, 2022

(65) Prior Publication Data
US 2024/0139650 A1    May 2, 2024

(51) Int. Cl.
*B01D 19/00* (2006.01)
*B01D 53/00* (2006.01)
*B01F 25/312* (2022.01)

(52) U.S. Cl.
CPC ....... *B01D 19/0063* (2013.01); *B01D 53/002* (2013.01); *B01F 25/31252* (2022.01)

(58) Field of Classification Search
CPC .............. B01D 19/0063; B01D 53/002; B01F 25/31252; F25B 9/08; F25B 2341/00; F25B 2341/001; F25B 2341/0011; F25B 2341/0013; F25B 43/006; F25B 43/00; F25B 2400/16
See application file for complete search history.

(56) References Cited

U.S. PATENT DOCUMENTS

| | | | |
|---|---|---|---|
| 2013/0251505 A1* | 9/2013 | Wang | F25B 9/008 415/114 |
| 2014/0275693 A1* | 9/2014 | Zink | B01D 53/18 422/255 |
| 2015/0174524 A1* | 6/2015 | Wynn | B01D 53/229 55/482 |

(Continued)

OTHER PUBLICATIONS

Leagas et al., "Ejector Technology for Efficient and Cost Effective Flare Gas Recovery," Proceedings of the GPA-GCC 24th Annual Technical Conference, Kuwait City, Kuwait, May 10-11, 2016, 10 pages.

(Continued)

*Primary Examiner* — Miguel A Diaz
(74) *Attorney, Agent, or Firm* — Osha Bergman Watanabe & Burton LLP

(57) ABSTRACT

The present disclosure is directed toward a system and a method for gas-condensate recovery. A gas-condensate separator is in fluid communication with a production header and an ejector comprising a motive inlet, a suction inlet, and an ejector outlet. The gas-condensate separator comprises an inlet, a gas outlet, and a recovered condensate outlet. The recovered condensate outlet is in fluid communication with the suction inlet of the ejector, and the ejector outlet is in fluid communication with the production header. The method comprises feeding a production fluid from a production header to a gas-condensate separator. The production fluid is separated in the gas-condensate separator. A gas and a recovered condensate are recovered and the recovered condensate is recycled into the production header.

16 Claims, 2 Drawing Sheets

(56) References Cited

U.S. PATENT DOCUMENTS

| | | |
|---|---|---|
| 2017/0160010 A1 | 6/2017 | Kenefake et al. |
| 2019/0022580 A1* | 1/2019 | Al Muhsen ........ B01D 53/1406 |
| 2019/0086130 A1* | 3/2019 | Hellmann ................. F25B 5/02 |
| 2020/0355413 A1* | 11/2020 | Monteith ................ F25B 40/02 |

OTHER PUBLICATIONS

Transvac, "Flare Gas Recovery," Brochure, https://www.transvac.co.uk/flare-gas-recovery/?web=1&wdLOR=c69178625-95EE-4A42-993D-DC7841BFB1FB, Accessed Oct. 2022, 19 pages.

Office Action issued by Saudi Arabian Patent Office for correspoding Saudi Arabiant patent application No. SA 123450699, mailed on Sep. 25, 2024 (18 pages).

* cited by examiner

NON-ASSOCIATED GAS CONDENSATE RECOVERY UTILIZING EJECTOR IN FLARING PROCESS

BACKGROUND

A gas gathering manifold (GGM) gathers produced gas and condensate in two to four large pipelines which transport the gas and condensate to the gas plant for further processing. A continuous flaring process is used in the GGM to burn flammable gas released from purge and pilot system and to accommodate any overpressure scenario in the piping network via the relief system. Condensate from the GGM may be sent directly to a flare-tip (ground flare), while gas may be sent as a purge gas and a pilot gas and burned.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a system including a gas-condensate separator that is in fluid communication with a production header and an ejector comprising a motive inlet, a suction inlet, and an ejector outlet. The gas-condensate separator includes an inlet, a gas outlet, and a recovered condensate outlet. The recovered condensate outlet is in fluid communication with the suction inlet of the ejector, and the ejector outlet is in fluid communication with the production header.

In another aspect, embodiments disclosed herein relate to a method including feeding a production fluid from a production header to a gas-condensate separator, the production fluid having a temperature in a range of from 100° F. to 110° F. and a pressure in a range of from 800 psig to 1000 psig. The production fluid is separated in the gas-condensate separator. A gas is recovered at a temperature in a range of from 35° F. to 45° F. and a pressure in a range of from 45 psig to 65 psig, and a recovered condensate is recovered at a temperature in a range of from 35° F. to 45° F. and a pressure in a range of from 45 psig to 65 psig. The recovered condensate is recycled into the production header.

Other aspects and advantages of the claimed subject matter will be apparent from the following description and the appended claims.

BRIEF DESCRIPTION OF DRAWINGS

In the drawings and related description the same reference numeral may be used to reference the flow conduit and the process stream contained within the flow conduit.

DETAILED DESCRIPTION

Flare systems are common in oil and gas production and are used to burn gases during emergency release. In some embodiments, an inlet stream comprising a production fluid from a production header may comprise gas and condensate. Gas may be separated from the condensate and sent to a blowdown piping network as a purge gas to remove stagnant material in the blowdown system, apply pressure in the system, and a pilot gas to keep the flare lit. The purpose of the purge gas in the piping network is to remove any stagnant condensate or by-products in the piping network, apply a positive pressure to avoid any oxygen ingress, and more importantly to provide the flare with gas to ensure that the flare remains lit at all times.

The condensate in the production fluid may be recovered and returned to the production header rather than being burned. Condensate may be separated from the gas and the separated condensate may be discharged back into a high-pressure transmission lines. The separated gas may then be discharged to the blowdown piping network. In one or more embodiments, the separated gas may be burnt in the flare-tip.

The inlet stream may be separated via various methods in a gas-condensate separator. In one or more embodiments, the gas-condensate separator may be a gas-condensate separator drum. The inlet stream may be separated into a gas stream and a recovered condensate stream.

The recovered condensate may be compressed prior to being recycled into the production header; compression and reintroduction may be performed via various means. In one or more embodiments, the condensate may be reintroduced to the production header using an ejector, which increases the pressure of the recovered condensate prior to being reintroduced into the production header. The ejector uses a high-pressure stream known as a motive stream that is fed through a motive inlet in the ejector to pull in a low-pressure stream that enters into a suction inlet in the ejector.

Figure 1:
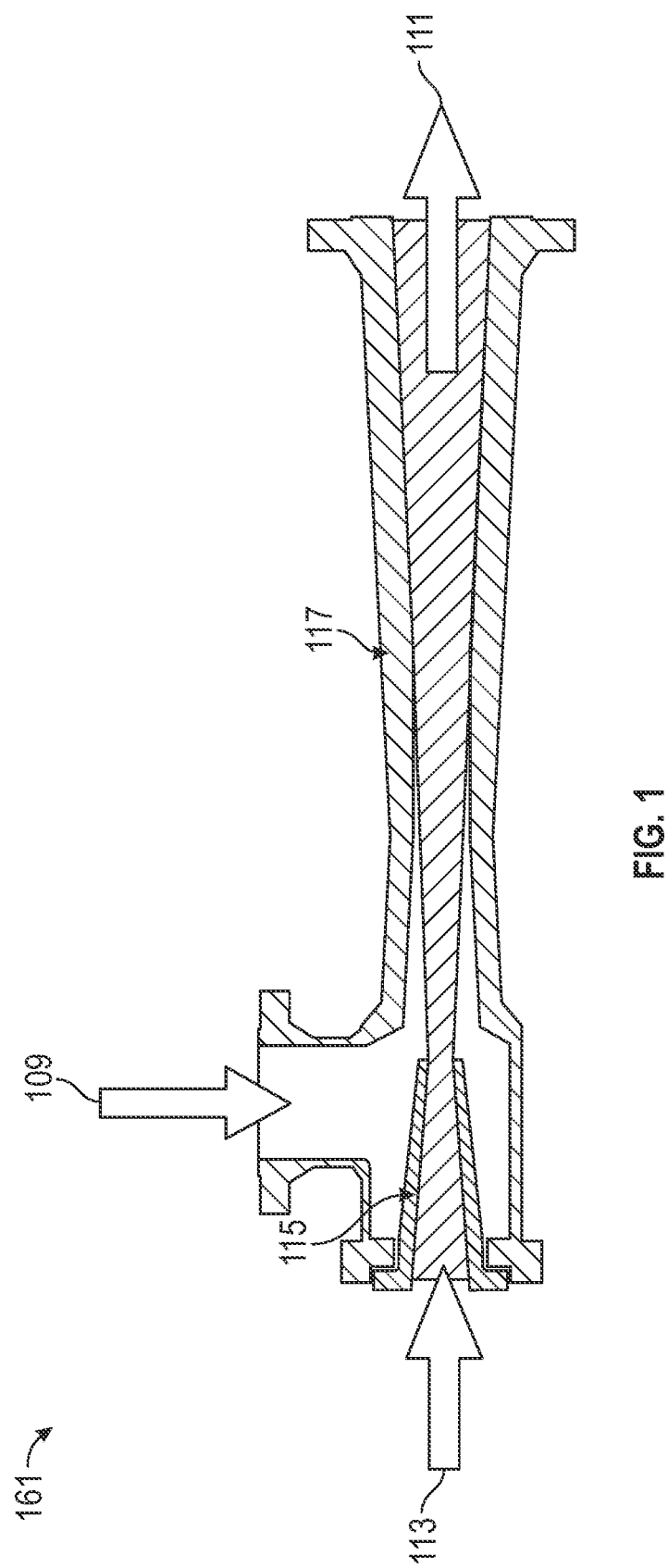
FIG. 1 is an illustration of an ejector.

FIG. 1 illustrates an ejector 161. The ejector 161 includes a nozzle 115 and a diffuser 117. A motive stream 113 enters through the nozzle 115 and accelerates, creating a low-pressure region and drawing in a low-pressure stream 109. The low-pressure stream 109 mixes with the motive stream 113. The mixed fluids travel through the diffuser 117, where the pressure increases as the fluid velocity is reduced. The mixed fluids exit the ejector 161 as the ejector outlet stream 111.

In one or more embodiments, the motive fluid may flow from the production header. The ejector 161 receives the motive stream 113 and the low-pressure stream 109, which in this case may be recovered condensate, compressing the low-pressure stream 109, and the mixed fluid exits via an ejector outlet as an ejector outlet stream 111. The ejector may operate in a single stage or in multiple stages.

In some embodiments, the recovered condensate is at a low-pressure and enters the suction inlet as the low-pressure stream where the recovered condensate meets a high-pressure gas stream that acts as the motive stream and may be from the production header. The motive stream may generate a low-pressure region, drawing in the recovered condensate. The recovered condensate is compressed and mixed with the motive stream before exiting the ejector as the ejector outlet stream. The ejector outlet stream is then introduced into the production header.

In some embodiments where a gas-condensate separator drum is used, a level control valve may be used to maintain a minimum level of liquid in the drum. With the level control valve, whenever the condensate level drops below a predetermined level, the position of the level control valve is altered, controlling the flow rate of the condensate from the gas-condensate separator drum. The level control valve may thus ensure the separator drum does not run dry as the ejector pulls in recovered condensate.

The level control valve may include a control valve and a sensor such as a float switch. The sensor may be used to determine the height of a fluid in the gas-condensate separator drum. The information may be used by a controller that may determine whether or how much to close the valve to keep the level of condensate in the gas-condensate separator drum above a minimum level.

In some embodiments, the separated gas exits the gas-condensate separator drum as a purge and pilot gas. The purge and pilot gas may be used to sweep and remove any stagnant condensate or by-products in the piping network, apply a positive pressure to avoid any oxygen ingress, and more importantly to provide the flare with gas to ensure that the flare remains lit at all times. Continuous provision of gas may be used to supply a continuous flare.

Figure 2:
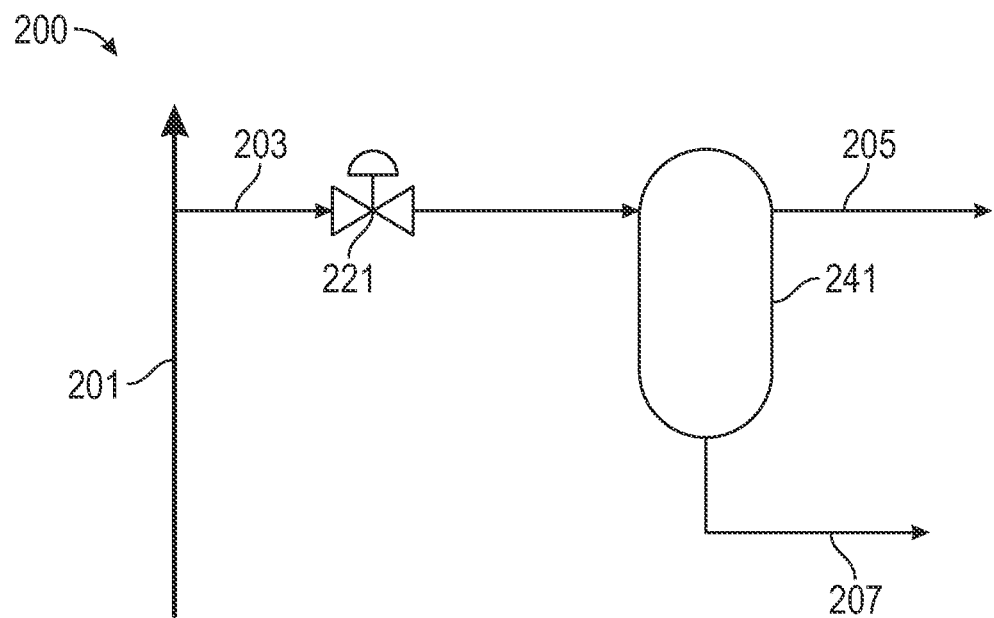
FIG. 2 illustrates a prior art gas gathering manifold system with no recovery of condensate.

FIG. 2 shows a prior art system 200 with no recovery of condensate. The system 200 comprises an inlet 203 and inlet valve 221 fluidly connected to a production header 201. The inlet 203 is connected to a gas-condensate separator drum 241 having a purge and pilot gas outlet 205 and a condensate outlet 207.

The high-pressure gas from the production header 201 is fed through the inlet 203, through the inlet valve 221 and into the gas-condensate separator drum 241. The gas-condensate separator drum 241 separates the gas from the condensate and the gas flows through the purge and pilot gas outlet 205 which then flows to a blowdown piping network, while the condensate flows through the condensate outlet 207 and to a burn pit.

Figure 3:
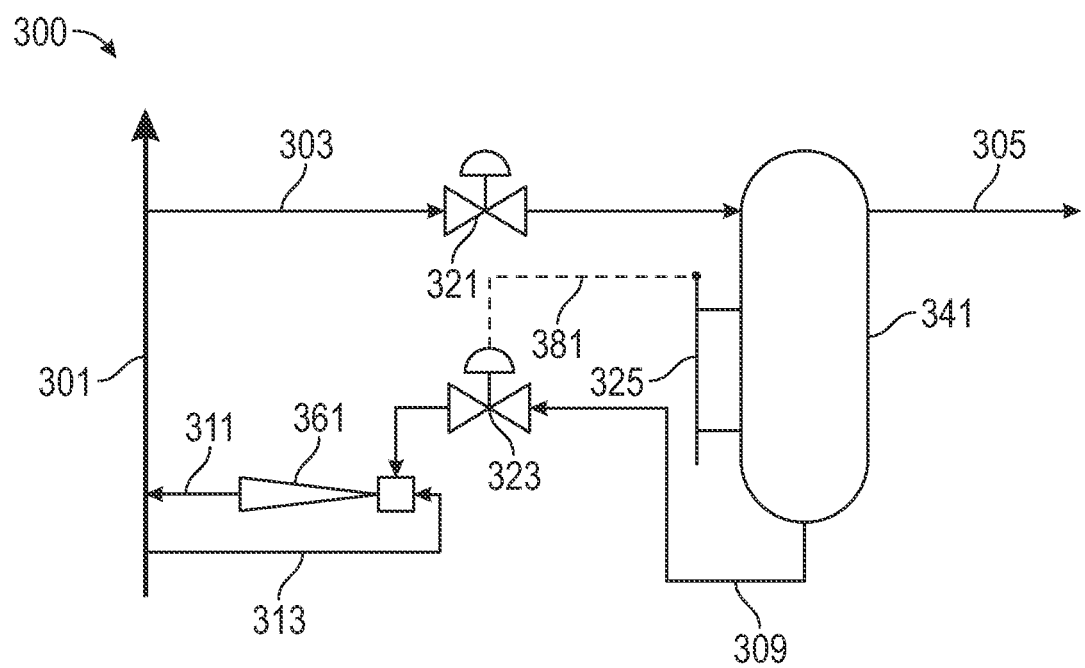
FIG. 3 illustrates a condensate recovery system according to one or more embodiments disclosed herein.

FIG. 3 illustrates one or more embodiments of a condensate recovery system 300. The system 300 includes an inlet 303 and inlet valve 321 fluidly connected to a production header 301. The inlet 303 is connected to a gas-condensate separator drum 341 having outlets for a purge and pilot gas 305 and a recovered condensate stream 309. The flowline of the recovered condensate stream 309 is fluidly connected to a level control valve 323. The recovered condensate stream 309 is connected to the suction inlet of the ejector 361. A motive stream 313 from the production header 301 is fed to the motive inlet of the ejector 361. The outlet of the ejector 361 is connected to the production header 301 via the ejector outlet stream 311. A level control system including the level control valve 323 and a level control valve sensor 325 may be configured to determine a level of a fluid in the gas-condensate separator 341. The level control valve 323 is connected to the level control valve sensor 325 by connection 381. The level control system may be used to control the level of a fluid in the gas-condensate separator 341. The level control valve 323 may be configured to control the level of a fluid in the gas-condensate separator 341 in response to the measured level of the fluid in the gas-condensate separator 341 by level control valve sensor 325.

Production fluid including gas and condensate may be fed from the production header 301 through an inlet 303 at a temperature in the range of about 100° F. to about 110° F. and a pressure in the range of about 800 psig to about 1000 psig. The production fluid is fed through the inlet valve 321 and into the gas-condensate separator drum 341. There, the stream is separated into condensate and gas components. The recovered condensate stream 309 may be recovered at a temperature in the range of about 35° F. to about 45° F. and a pressure in the range of about 45 psig to about 65 psig. The recovered condensate stream 309 flows through the level control valve 323 and into the suction inlet of the ejector 361. The level control valve sensor 325 senses the recovered condensate stream 309, which may have a temperature and pressure similar to the production fluid, from the production header 301 is fed into the motive inlet of the ejector 361. The recovered condensate 309 and the motive stream 313 combine, compressing the condensate in the recovered condensate stream 309 to a pressure in the range of about 800 psig to about 1000 psig. The pressurized ejector outlet stream 311 is then fed to the production header 301.

The gas-condensate separator drum 341 may also produce a purge and pilot gas 305 having a temperature in the range of about 35° F. to about 45° F. and a pressure in the range of about 45 psig to about 65 psig. The purge and pilot gas 305 may be sent to a downstream flare system to sweep any stagnant condensate or by-products in the piping network, apply a positive pressure to avoid any oxygen ingress, and to provide the flare with gas to ensure it remains lit at all times. The continuous flare may only be lit from the purge and pilot gas 305.

Unless defined otherwise, all technical and scientific terms used have the same meaning as commonly understood by one of ordinary skill in the art to which these systems, apparatuses, methods, processes, and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A system comprising:
    a gas-condensate separator that is in fluid communication with a production header;
    an ejector comprising a motive inlet, a suction inlet, and an ejector outlet,
    the gas-condensate separator comprising an inlet, a purge and pilot gas outlet, and a recovered condensate outlet,
    where the recovered condensate outlet is in fluid communication with the suction inlet of the ejector,
    where the ejector outlet is in fluid communication with the production header,
    where the purge and pilot gas outlet is in fluid communication with a blowdown piping network, and
    where the motive inlet is in direct fluid communication with the production header.

2. The system of claim 1, further comprising a level control valve sensor configured to determine a level of a fluid in the gas-condensate separator.

3. The system of claim 2, further comprising a level control valve configured to control the level of a fluid in the gas-condensate separator in response to the determined level of the fluid in the gas-condensate separator.

4. A method comprising:
feeding a production fluid from a production header to a gas-condensate separator;
separating the production fluid in the gas-condensate separator, recovering a purge and pilot gas and a recovered condensate;
directing the purge and pilot gas to a downstream blowdown piping network; and
combining the recovered condensate and a high-pressure gas stream from the production header in an ejector to produce an ejector outlet stream; and
feeding the ejector outlet stream to the production header.

5. The method of claim 4, further comprising maintaining a level of condensate in the gas-condensate separator, where the maintaining comprises controlling the flow rate of the condensate from the gas-condensate separator.

6. The method of claim 5, where the controlling comprises altering the position of a level control valve.

7. The method of claim 5, where the maintaining comprises using a level control valve sensor to determine a level of a fluid in the gas-condensate separator.

8. The method of claim 4, where the pressure of the production fluid is in a range of about 800 psig to about 1000 psig.

9. The method of claim 4, where the temperature of the production fluid is in a range of about 100° F. to about 110° F.

10. The method of claim 4, where the pressure of the purge and pilot gas is in a range of about 45 psig to about 65 psig.

11. The method of claim 4, where the temperature of the purge and pilot gas is in a range of about 35° F. to about 45° F.

12. The method of claim 4, where the pressure of the recovered condensate is in a range of about 45 psig to about 65 psig.

13. The method of claim 4, where the temperature of the recovered condensate is in a range of about 35° F. to about 45° F.

14. The method of claim 4, where the pressure of the ejector outlet stream is in a range of about 800 psig to about 1000 psig.

15. The system of claim 1, where the blowdown piping system comprises a flare system.

16. The method of claim 4, wherein the purge and pilot gas maintains a continuously lit flare in the downstream blowdown piping network.

* * * * *